UNITED STATES PATENT OFFICE.

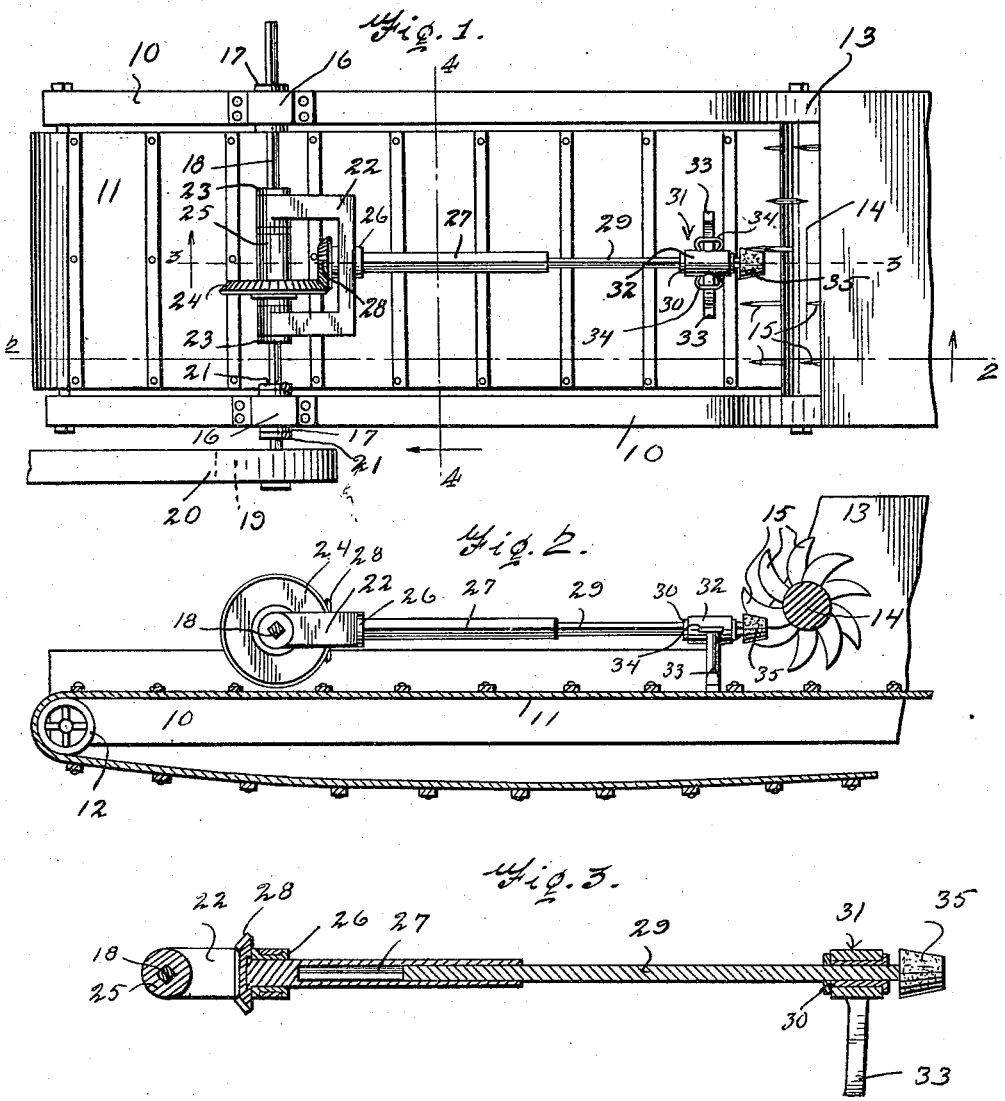

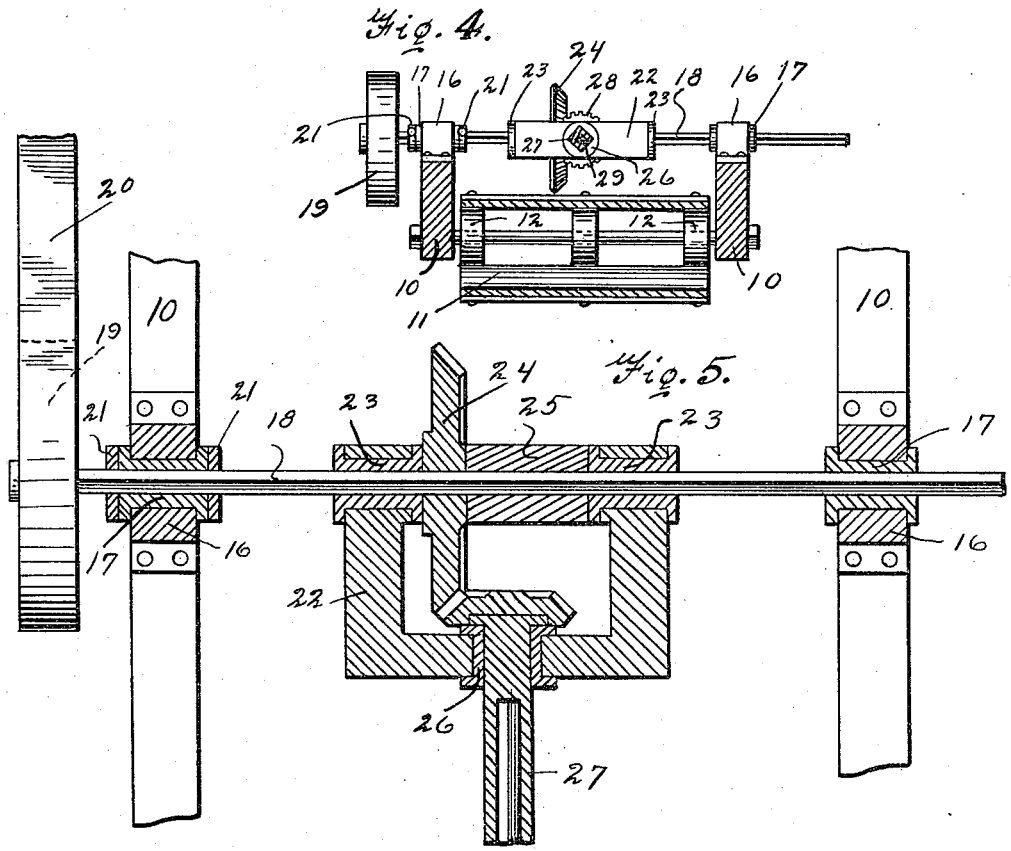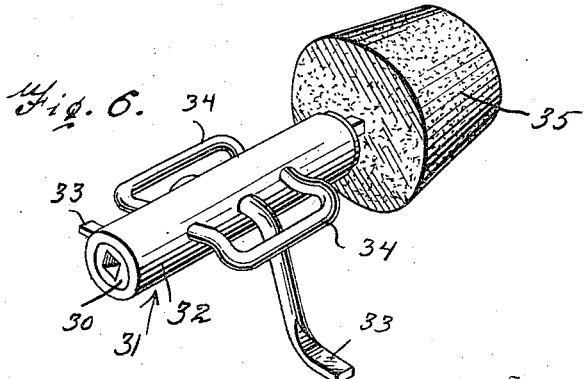

JOHN KOHOUTEK, OF LIDGERWOOD, NORTH DAKOTA.

KNIFE-SHARPENER FOR THRESHING-MACHINE FEEDERS.

1,184,540.  Specification of Letters Patent.  Patented May 23, 1916.

Application filed September 21, 1914. Serial No. 862,743.

*To all whom it may concern:*

Be it known that I, JOHN KOHOUTEK, a citizen of the United States, residing at Lidgerwood, in the county of Richland, State of North Dakota, have invented certain new and useful Improvements in Knife-Sharpeners for Threshing - Machine Feeders; and I do hereby declare the following to be a full, clear, and exact description of the invention, such as will enable others skilled in the art to which it appertains to make and use the same.

This invention relates to attachments for threshing machines, particularly to attachments to the feeders thereof, and has for its object the provision of means whereby the knives may be sharpened by power without removing the knife carrying roller from the threshing machine.

An important object is the provision of a device of this character which is movable laterally of the feeder while the device is in motion so that all the knives may be readily sharpened.

A further object is the provision of a device of this character which has its parts extensible and adjustable to adapt it for use upon feeders of different styles and sizes.

Another object is the provision of a knife sharpening device having its actual grinding mechanism engaging the knives of peculiar and novel construction.

Still another object is the provision of actuating means driven from the engine supplying power to the feeder so constructed that the grinding mechanism may be moved laterally while still retaining its operative connection with the driving mechanism.

An additional object is the provision of a device of this character which will be simple and inexpensive in manufacture, easily attached to and detached from a feeder, efficient and durable in service and a general improvement of the art.

With these and other objects and advantages in view, the invention consists in the novel construction and arrangement of parts as will be hereinafter more fully described and claimed, and illustrated in the accompanying drawing, in which—

Figure 1 is a top plan view of my device in position upon a feeder of a threshing machine, Fig. 2 is a vertical longitudinal sectional view through the feeder showing the device in position, Fig. 3 is a vertical sectional view through the device detached, Fig. 4 is a cross sectional view through the feeder showing the device in end elevation, Fig. 5 is a top plan view on a larger scale of the rear portion of the device, parts being broken away and in section, and Fig. 6 is a perspective view of the grinder.

Referring more particularly to the drawing the numeral 10 designates the side boards of the frame of the feeder comprising the conveyer apron 11 trained about the rollers 12. The rear portion of the feeder frame is designated by the numeral 13 and revolubly supports the roller 14 carrying the cutting knives 15.

My invention contemplates the provision of means attachable to the feeder for sharpening the knives 15. In carrying out this purpose, I provide a pair of bearing blocks 16 secured upon the side boards 10 and having revoluble therein bushings 17 having square holes therethrough. A square shaft 18 extends through the bushings 17 and is provided upon one end with a pulley 19 driven by a belt 20 from the engine supplying power to the feeder. The shaft 18 is prevented from longitudinal movement by collars 21 disposed against each side of the bearing block 16 adjacent the pulley 19.

Disposed for longitudinal sliding movement upon the shaft 18 is a carriage comprising a U-shaped yoke 22 having bushings 23 revoluble within the ends of its arms and provided with square openings for the passage of the shaft 18. A bevel gear 24 is disposed upon the shaft 18 between the arms of the yoke and is held in proper relation therebetween by spacing sleeves 25. By this construction it will be seen that the yoke 22 carrying the gear 24 may be slid longitudinally of the shaft 18 while the shaft is rotated by the medium of the pulley 19, and at the same time the gear 24 will of course rotate also.

The main portion of the yoke 22 has a revoluble bushing 26 therein which is provided with a square hole for the passage of a square hollow shaft 27 carrying a bevel pinion 28 meshing with the gear 24. A square shaft 29 is disposed within the hollow shaft 27 and carries at its forward end a bushing 30 revoluble within the grinder head designated as a whole by the numeral 31.

The grinder head 31 comprises a tubular shank 32 revolubly receiving the bushing 30 and provided with legs 33 and also provided with laterally extending handles 34 for a purpose to be described. The shaft 29 extends through the bushing 30 and shank 32 and is provided upon its extreme end with a grinding wheel 35 of emery carborundum or the like, the wheel being formed tapered as shown.

The operation of the device is as follows: The bearing blocks 16 being permanently attached to the side boards 10, when it is desired to sharpen the knives 15, the shaft 18 is inserted through the bushing 17 in the bearing at the right hand side of the feeder, is then inserted through the bushings 23 in the yoke 22 and is then inserted through the bushing 17 in the other bearing block, after which the inner collar 21 is secured to prevent longitudinal movement of the shaft. Power being applied to the pulley 19, the shaft 18 and gear 24 will be rotated thereby rotating the pinion 28, the hollow shaft 27 and the shaft 29 carrying the grinding wheel 35. By grasping the handle 34 the operator can move the grinder in the desired manner and direction for properly sharpening the blades 15, the tapered shape of the wheel 35 being of the pitch to give the cutting edges of the knives the proper angle. If desired the operator may release the handles 34 and set the grinder head down upon the apron 11, the legs 33 supporting the grinder. By sliding the yoke 22 longitudinally upon the shaft 18, access may be had to any and all of the knives. When the desired sharpening has been accomplished, the device is removed from the feeder.

It is to be observed that as the shaft 18 is of considerably greater length than the width of the feeder the device is readily adapted for use upon feeders of different widths as the shaft 18 freely passes through the left hand bearing block 16. Also by virtue of the fact that the hollow shaft 27 telescopically receives the shaft 29 the device is adapted for use upon large or small feeders and the positioning of the bearing blocks 16 is not a matter of importance.

From the foregoing description and a study of the drawing it will be apparent that I have thus provided a simple, novel and efficient device whereby the knives of a feeder of a threshing machine may be quickly, easily and properly sharpened without removing the knives from the machine.

It will be readily understood that I reserve the right to make various changes in the form, construction, and arrangement of parts without departing from the spirit of the invention or limiting the scope of the subjoined claim.

Having thus described my invention, I claim:

A device for sharpening the knives of threshing machine feeders or the like without necessitating their removal from the machine comprising the combination with a machine including a knife carrying roller, of a pair of bearings secured on the frame of the machine, a shaft adapted to be detachably mounted in these bearings to extend parallel to the roller and further adapted for connection with one of the drive shafts of the machine to be rotated thereby, an extensible shaft having one end portion slidably and pivotally secured to the first shaft and geared thereto to be rotated thereby, grinding means on the other end of the shaft, a sleeve journaled on said last named shaft and having legs carried thereby for engaging the conveyer apron of the machine to position the grinding means in proper respect to a selected knife.

In testimony whereof, I affix my signature, in the presence of two witnesses.

JOHN KOHOUTEK.

Witnesses:
ANTON KOHOUTEK,
CHARLES KOHOUTEK.

Copies of this patent may be obtained for five cents each, by addressing the "Commissioner of Patents, Washington, D. C."